(12) United States Patent
Lie

(10) Patent No.: US 8,620,995 B2
(45) Date of Patent: Dec. 31, 2013

(54) METHOD, COMPUTER PROGRAM, TRANSCODING SERVER AND COMPUTER SYSTEM FOR MODIFYING A DIGITAL DOCUMENT

(75) Inventor: Håkon Wium Lie, Oslo (NO)

(73) Assignee: Opera Software ASA, Oslo (NO)

( * ) Notice: Subject to any disclaimer, the term of this patent is extended or adjusted under 35 U.S.C. 154(b) by 193 days.

(21) Appl. No.: 11/902,187

(22) Filed: Sep. 19, 2007

(65) Prior Publication Data

US 2008/0071857 A1   Mar. 20, 2008

(30) Foreign Application Priority Data

Sep. 20, 2006   (NO) .................................. 20064267

(51) Int. Cl.
  *G06F 15/16*   (2006.01)
  *G06F 7/00*   (2006.01)
  *G06F 17/30*   (2006.01)

(52) U.S. Cl.
  USPC ............................. 709/203; 707/602; 707/795

(58) Field of Classification Search
  USPC ........................................................ 709/203
  See application file for complete search history.

(56) References Cited

U.S. PATENT DOCUMENTS

| | | | | |
|---|---|---|---|---|
| 6,421,733 | B1 * | 7/2002 | Tso et al. | 709/246 |
| 6,963,877 | B2 * | 11/2005 | Layeghi | 707/102 |
| 6,970,602 | B1 * | 11/2005 | Smith et al. | 382/232 |
| 2002/0010725 | A1 * | 1/2002 | Mo | 707/530 |
| 2002/0010746 | A1 * | 1/2002 | Jilk et al. | 709/206 |
| 2003/0014499 | A1 | 1/2003 | Mighdoll et al. | |
| 2004/0024826 | A1 * | 2/2004 | Halahmi et al. | 709/206 |
| 2005/0114658 | A1 * | 5/2005 | Dye et al. | 713/165 |
| 2006/0168012 | A1 * | 7/2006 | Rose et al. | 709/206 |
| 2007/0016613 | A1 * | 1/2007 | Foresti et al. | 707/104.1 |

FOREIGN PATENT DOCUMENTS

EP   1079315 A2   2/2001

OTHER PUBLICATIONS

RFC 2397—The data URL scheme, Author: Larry Masinter, Xerox Corporation, Published: Aug. 1998 http://tools.ietf.org/html/rfc2397.*

* cited by examiner

*Primary Examiner* — Noel Beharry
(74) *Attorney, Agent, or Firm* — Birch, Stewart, Kolasch & Birch, LLP

(57) ABSTRACT

The present invention relates to a method for modifying a digital document, comprising steps of detecting embedded data contained in the document; extracting said data from said document; storing said data as a separate file; and replacing said extracted data in said document with a reference to said file. The method may be performed by a transcoding server in order to increase the overall performance of a mobile client terminal equipped with a web browser.

17 Claims, 4 Drawing Sheets

METHOD, COMPUTER PROGRAM, TRANSCODING SERVER AND COMPUTER SYSTEM FOR MODIFYING A DIGITAL DOCUMENT

FIELD OF THE INVENTION

The present invention relates in general to information processing. More specifically, the invention relates to a method for modifying a digital document and a method for modifying a digital document in a transcoding server. The invention also relates to a computer program, a transcoding server and a computer system which involves the performing of such a method.

BACKGROUND OF THE INVENTION

Mobile communication terminals enabled for web browsing are gaining increasing popularity. Such mobile communication terminals include mobile telephones, smartphones, PDAs and handheld/notebook computers, which include browser client software, and which are arranged for operating in a wireless server/client environment. Such mobile terminals may suffer from reduced performance, including computational capacity, memory capacity, and/or communication bandwidth capacity, compared to stationary full-scale computer devices. There is thus a general need to provide solutions that result in improved overall performance of such devices when they are operating in a client/server environment. The present invention relates to such solutions which involve the modifying of a digital document, e.g. a markup language document held in a transcoding server.

SUMMARY OF THE INVENTION

The invention is defined by the appended claims.
Additional features and principles of the present invention will be recognized from the detailed description below.

It is to be understood that both the foregoing general description and the following detailed description are exemplary and explanatory only and are not restrictive of the invention, as claimed.

BRIEF DESCRIPTION OF THE DRAWINGS

The accompanying drawings illustrate an embodiment of the invention. In the drawings.

DETAILED DESCRIPTION OF THE INVENTION

Reference will now be made in detail to the present invention, examples of which are illustrated in the accompanying drawings. Wherever possible, the same reference numbers will be used throughout the drawings to refer to the same or like parts.

Figure 1:
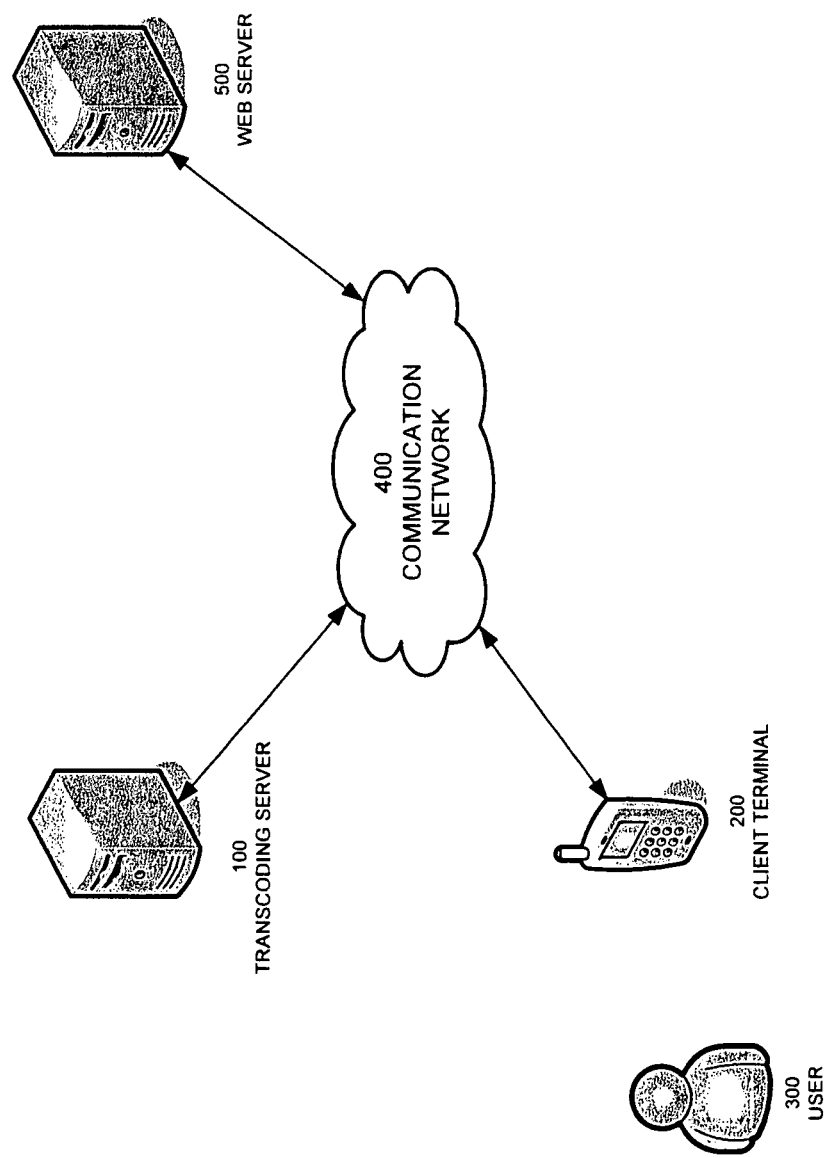
FIG. 1 is an exemplary block diagram illustrating an embodiment of a system in accordance with the invention.

FIG. 1 is an exemplary block diagram illustrating an embodiment of a system in accordance with the invention.

A client terminal 200 is operated by a user 300. The client terminal 200 is a mobile communication terminal, such as a mobile telephone, equipped with a browser application.

The browser application may e.g. be a so called micro browser application, although the invention is not limited in this respect. In particular, the browser application may e.g. be a Java-based micro browser application, although alternatives are of course possible.

The terminal 200 is operatively connected to the proxy server or transcoding server 100 via the communication network 400.

The transcoding server is arranged to fetch digital documents, e.g. web content, such as HTML pages, from other web servers, e.g. the web server 500, connected to the communication network 400. The transcoding server is further arranged to process the fetched content in such a way that it is modified or reformatted in order to be appropriately received and rendered on the mobile client terminal 100.

In particular, the communication network 400 is arranged for providing wireless mobile communication with the client terminal 200. The network 400 is also arranged for providing communication with the transcoding server 100 and the web server 500. The network 400 may thus typically comprise both the Internet and a wireless communication subnetwork. The wireless subnetwork is, e.g., a mobile communication network such as a GSM network, or alternatively a GPRS, UMTS/3G, CDMA, or PCS network, or alternatively a local wireless network such as a WLAN. The network 400 also comprises gateways necessary in order to provide intercommunication between the Internet and the wireless subnetwork.

The client terminal 200 is a mobile communication terminal, such as a mobile telephone, a PDA, or a palmtop computer. Typically, the client terminal has limited computational resources and/or reduced user interface resources (such as display and input devices), and/or reduced communication capabilities, compared to a full-size personal computer.

The exemplary client terminal 200 comprises an internal bus which interconnects a central processing device, a memory, a display adapter, and an input adapter. The internal elements of the client terminal have not been illustrated in the figures. The bus is also connected to a communication adapter that enables communication between the client terminal and the network 400. The communication adapter may be a GSM, GPRS, UMTS, CDMA, or PCS module, adapted for interoperability with the mobile communication subnetwork that is included in the network 400. Alternatively, the terminal 200 may be arranged to communicate with the network 400 by means of local wireless communication, such as WLAN. The display adapter is further connected to a display, and the input adapter is further connected to a user operated input device such as a keyboard. The central processing unit in the client terminal 200 is arranged to execute instructions embodied in a computer program retained in the memory.

The computer program in the memory particularly comprises a web browser program, such as a micro browser, although the invention is not limited in this respect. The browser is configured to provide the user with web browsing features by offloading memory-intensive processes to a proxy server, in particular the transcoding server 100.

The micro browser may e.g. be a Java application which e.g. is downloadable from another server connected to the network 400. The invention is not limited in this respect.

A possible task of the transcoding server 100 is to reformat web pages, i.e. markup language documents, fetched from servers such as the web server 500, to a more compact representation than their original representation. An example is the Opera Binary Markup Language (OBML). As a part of the reformatting process, the content may be adapted for rendering on a small display screen.

Unlike a regular, full-size web browser applicable for a full-scale computer, the browser may be included in and executed by a compact client terminal 200 such as a mobile telephone, since it demands substantially less memory and computational resources.

Figure 2:
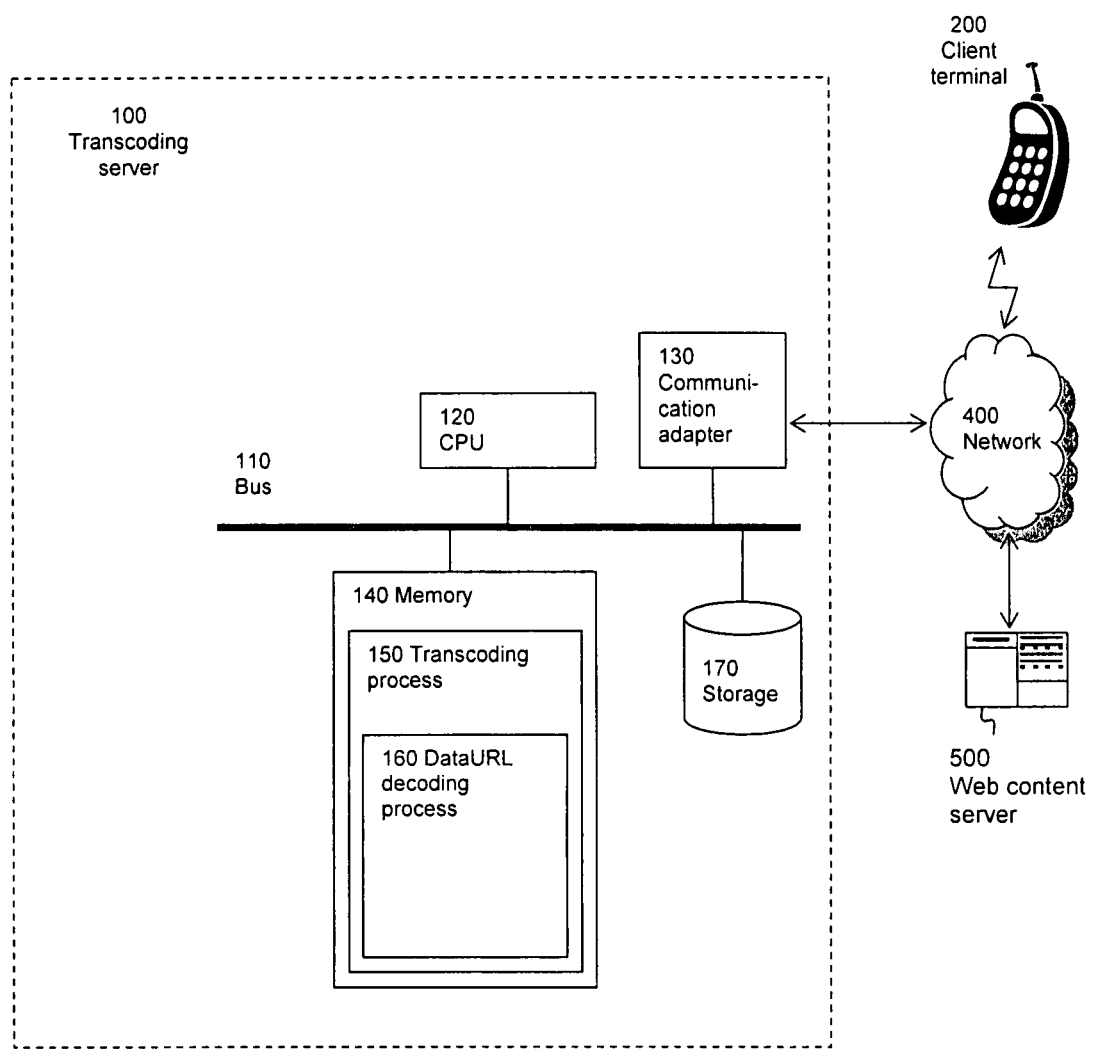
FIG. 2 is a block diagram illustrating a transcoding server in accordance with the invention.

FIG. 2 is a block diagram illustrating a transcoding server in accordance with an embodiment of the invention.

The transcoding server 100 comprises an internal bus 110, which is connected to a central processing unit 120, arranged to execute instructions embodied in a computer program retained in the memory 140, which is also connected to the bus 110. As would be readily understood by a person of ordinary skill in the art, the memory 140 is an example of a "non-transitory" computer-readable medium in which such a computer program may be embodied, the term "non-transitory" being used herein to distinguish such media from transitory forms of signal transmission.

The bus 110 is also connected to a data storage 170, such as a magnetic medium, for non-volatile storage of programs and/or data.

The bus 110 is also connected to a communication adapter 130 which provides communication with the network 400. The communication adapter may be a high bandwidth network adapter.

In addition, the transcoding server may comprise additional devices (not illustrated), connected to the internal bus 110. Such additional devices include an output device such as a display adapter, which is further connected to a display, and an input adapter, which is connected to input devices such as a keyboard and a pointer device.

The computer program in the memory 140 particularly comprises a transcoding process 150. The transcoding process 150 particularly comprises a data URL decoding process 160.

The transcoding process 150 comprises computer program portions for accessing a requested resource or content, such as a markup language document, for instance an HTML document, from a web server 500 connected to the transcoding server 100 via the communications network 400.

The transcoding process 150 further comprises computer program portions for communicating with the client terminal 200 via the network 400.

The transcoding process 150 is arranged to perform a method according to the invention, such as one of the embodiments being described in detail below with reference to FIG. 3 or 4.

Figure 3:
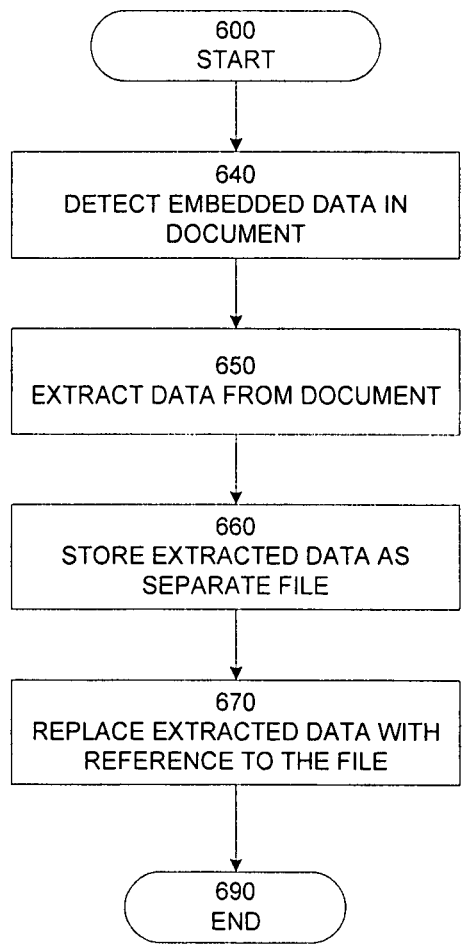
FIG. 3 is an exemplary flow chart illustrating a first embodiment of a method in accordance with the invention.

FIG. 3 is an exemplary flow chart illustrating a first embodiment of a method in accordance with the invention, Consistent with the invention, the method may be performed by a transcoding server, such as the transcoding server 100 illustrated by example above with reference to FIGS. 1 and 2.

The method starts at the initial step 600.

In this embodiment of the method it is assumed that the digital document that shall be modified is already available in the transcoding server 100. The document may have been provided in advance from a web server, e.g. as a result of a request by a browser client, although the invention is not limited in this respect.

The digital document may be a markup language document, such as a HTML, XML or XHTML document, although the invention is not limited to such document specifications.

Next, in step 640, a scan of the document is performed in order to detect embedded data contained in the document. Embedded data should be understood as a data item that is included as "immediate" data in the markup language code. Although the invention is not necessarily limited in this particular respect, the embedded data may be a short data item, such as media data, e.g. an image. According to an embodiment of the invention, the embedded data is a data URL in accordance with the RFC 2397 specification by L. Masinter of Xerox Corporation, "The 'data' URL scheme," published by the Network Working Group of the Internet Engineering Task Force, August 1998, which is hereby incorporated by reference.

Next, in step 650, the embedded data is extracted from the document.

According to one embodiment, the embedded data includes an identification of a coding scheme which has been used to encode said embedded data, and the extracting step 650 includes the substep of decoding the embedded data in accordance with the coding scheme. The coding scheme may be, e.g., base64.

In a further embodiment, an additional test step is performed subsequent to the detecting step 640 in order to determine if a predefined rule is fulfilled by the detected, embedded data. In this embodiment, the extracting step 650 is performed on the condition that the predefined rule is fulfilled.

The rule may, e.g. be determined to be fulfilled if the document has a size that exceeds a specified size limit. The size limit may be in the interval [64 bytes, 4096 bytes], or in particular in the interval [128 bytes, 2048 bytes]. In a special embodiment, the size limit is in the interval [256 bytes, 1024 bytes], or more specifically, about 512 bytes.

Alternatively or in addition, the rule may be fulfilled if the embedded data belongs to a set of predetermined, allowable data types.

According to one embodiment, a substep is also performed in order to derive a definition of the data type of the embedded data. This deriving substep may be included in either of the detecting step 640 or the extracting step 650. The definition of a data type may be a definition of a mime type.

In yet another embodiment, the extracting step 650 is performed directly and unconditionally subsequent to the detecting step 640, i.e. without the application of any predefined rule.

Next, in step 660, the extracted data is stored as a separate file, e.g. on the transcoding server.

In one embodiment, the storing step 660 comprises formatting the file in accordance with the data type derived in step 640 or 650.

Next, in step 670, the extracted data is replaced with a reference to the filed stored in step 660. This causes that only the reference to the separate file is included in the resulting, modified document. In turn, this leads to reduced data transfer from the transcoding server to the browser client that is intended as the final recipient of the data. Consequently, the invention facilitates a more efficiently memory usage and/or communication bandwidth of the mobile terminal with the browser client.

The process according to this embodiment terminates at the terminating step 690. An appropriate, subsequent step might be to submit the modified document to the client browser in the mobile terminal.

Figure 4:
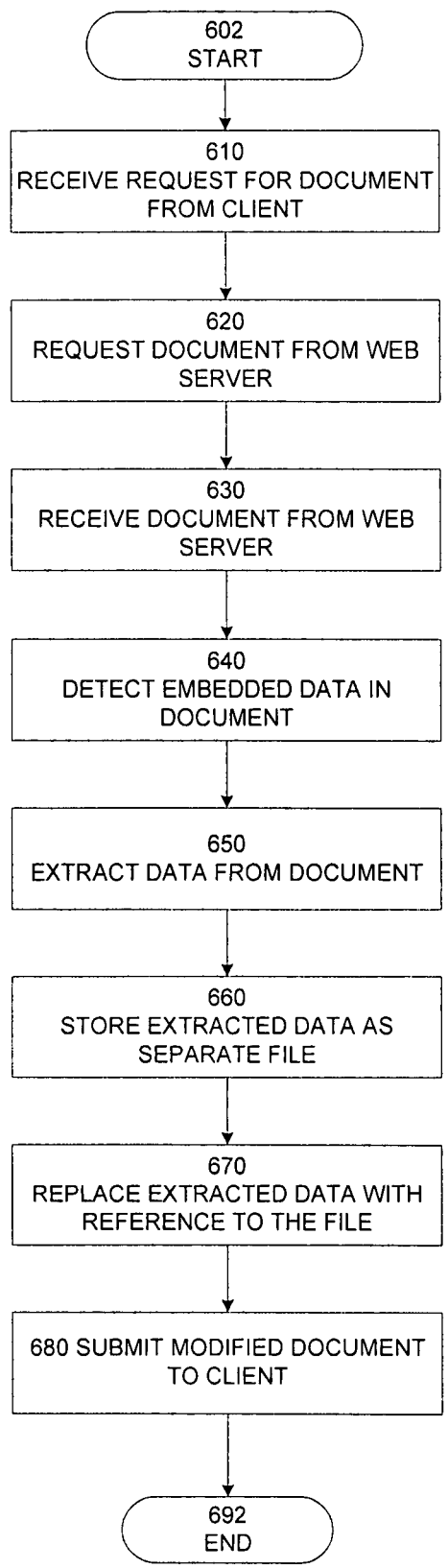
FIG. 4 is an exemplary flow chart illustrating a second embodiment of a method in accordance with the invention.

FIG. 4 is an exemplary flow chart illustrating a second embodiment of a method in accordance with the invention, Consistent with the invention, the method is performed by a transcoding server, such as a transcoding server 100 as illustrated by example above with reference to FIGS. 1 and 2.

This embodiment of the method starts at the initial step 602.

First, in step 610, a request for a digital document is received, typically from an application program executed by a client terminal, such as the browser application executed by the client terminal 200. The digital document is, e.g., a markup language document, such as an HTML, XML or XHTML document, although the invention is not limited in this respect.

Next, in step 620, a request for the digital document is submitted to the web server 500.

Next, in step 630, the document is received from the web server 500.

Next, a detecting step 640, an extracting step 650, a storing step 660 and a replacing step 670 are performed in the same way as the corresponding steps described and illustrated with reference to FIG. 3 above.

Thus, embedded data such as a data URL is detected in step 640 and the embedded data is extracted from the document in step 650. One of these steps may include a decoding substep wherein the embedded data is decoded in accordance with a coding scheme identified by an identification included in the embedded data. The detecting step may include a test step, involving a predetermined rule of the kind described above with reference to FIG. 3. Alternatively, the test step is not included.

In the storing step 660, the extracted data is stored as a separate file, e.g. on the transcoding server. The storing step 660 may include a formatting substep. In the replacing step 670, the extracted data is replaced with a reference to the filed stored in step 660.

Further, according to the embodiment illustrated in FIG. 4, the resulting, modified digital document is submitted to the client through the network 400.

The process according to this embodiment terminates at the terminating step 692.

It will be understood that the browser application running on the client 200 may be configured to request the extracted data based on the reference inserted in the modified document. However, the client may also be configured not to download such data, or to only download data of certain data types.

According to a further embodiment of the invention, the steps 630 of detecting embedded data and the step 640 of extracting the embedded data is performed substantially in accordance with the description above, and further, a characteristic value representing said extracted data is derived from the extracted data.

This deriving substep may comprise to apply a hash algorithm to said data. In this case, the characteristic value is a hash value resulting from the hash algorithm. Alternatively, other types of fingerprint or signature data may be generated in the deriving substep.

Further in this embodiment, the derived characteristic value, such as the hash value, is compared with previously stored characteristic values, e.g. stored hash values.

Upon a match between the derived characteristic value and a previously stored characteristic value, the method further comprises, in this embodiment, replacing the extracted data with a reference to a stored file that is associated with the stored characteristic value. For instance, the characteristic value may be stored in a table with a reference to the stored file.

The steps of generating a characteristic value and inserting the characteristic value and file reference in a table may e.g. be performed as substeps of the extracting step 650, storing step 660 or replacing step 670.

The re-use of extracted data obtained according to this embodiment saves storage space on the transcoding server 100 performing the method, since identical data extracted several times is stored only once. In addition, it makes it possible for the browser application running on the client terminal 200 to cache the extracted file in local memory such that the data can be reused in stead of downloaded repeatedly.

This may save bandwidth usage, but it may also save storage space on the client 200, e.g. if downloaded documents are stored locally, extracted portions that are replicated several times in a document or over several documents may be stored only once.

In this embodiment, as well as in other embodiments of the method, the extracting step 650 may be performed conditionally, dependent on a predetermined rule of the kind described above with reference to FIG. 3.

It will be understood by those with skill in the art that the various steps of the method do not necessarily have to be performed in the sequence described. The relevant data must by necessity be detected and extracted before it can be stored as a separate file, but the insertion of a reference to the external file can take place before or after the data is extracted and/or deleted from the original file, and before or after the external file is created. Consequently, as long as the relevant data are available to a particular step of the method, the step may be performed before, concurrently with or after other steps, and no additional limitation of the invention should be read into the invention by the sequence the steps have been recited in this specification or in the claims.

The above method may be implemented by the skilled person as a computer program, which may be embodied as program instructions stored on a computer-readable medium or carried by a propagating signal. The computer program will, when loaded into the memory 130 in the transcoding server 100, cause the processing device 120 in the transcoding server 100 to perform the method according to the invention.

Several modifications and adaptations of the present invention will be apparent to those skilled in the art from consideration of the specification and practice of the invention.

The above detailed description of the invention has been presented for purposes of illustration. It is not exhaustive and does not limit the invention to the precise form disclosed. Modifications and variations are possible in light of the above teachings or may be acquired from the practicing of the invention.

The invention claimed is:

1. Computer-implemented method, comprising:
   utilizing a processor within a computer to perform a process in response to receiving a request for a web page comprising a document written in markup language code from an external device via a network, the process comprising:
   detecting embedded data contained in the markup language code of said document;
   extracting said data from the markup language code of said document;
   in response to detecting and extracting said data, storing said extracted data as a separate file;
   modifying said document by replacing said extracted data in the markup language code of said document with a reference to said file; and
   transmitting said modified document to the external device via the network, without transmitting said data to the external device until a subsequent request for said data is made by the external device on the basis of said reference, wherein said embedded data is a data URL.

2. Method according to claim 1, wherein
said step of detecting said embedded data or said step of extracting said embedded data includes deriving a definition of a data type of the embedded data.

3. Method according to claim 2, wherein
said step of storing said data as a separate file comprises to format said file in accordance with said data type.

4. Method according to claim 3, wherein said definition of a data type is a definition of a MIME type.

5. Method according to claim 1, wherein
said embedded data includes an identification of a coding scheme which has been used to encode said embedded data, and
the step of extracting said embedded data includes the step of decoding the embedded data in accordance with the coding scheme.

6. Method according to claim 5, wherein said coding scheme is base64.

7. Method according to claim 1,
wherein said step of extracting is performed unconditionally, subsequent to said step of detecting said embedded data.

8. Method according to claim 1,
further comprising determining if a predefined rule is fulfilled, and
wherein said step of extracting is performed on the condition that said predefined rule is fulfilled.

9. Method according to claim 8, wherein said rule is fulfilled if said document has a size that exceeds a specified size limit.

10. Method according to claim 9, wherein said size limit is in the interval [60 bytes, 2000 bytes].

11. Method according to claim 8, wherein said rule is fulfilled if said embedded data is included in a set of allowable data types.

12. Computer program, stored on a non-transitory computer-readable medium, comprising program instructions for causing a processing device in a transcoding server to perform a method in accordance with claim 1 when executed by the processing device.

13. Transcoding server, comprising the computer processor and a memory, the memory containing computer program instructions for causing the transcoding server to perform the process in accordance with claim 1 when executed by the computer processor.

14. Computer system, comprising
a communication network,
a client terminal operatively connected to the network,
a web server operatively connected to the network, and
a transcoding server operatively connected to the network, the transcoding server being configured to perform a method in accordance with claim 1 as a response to a request from said client terminal.

15. Computer-implemented method, comprising:
utilizing a processor within a computer to perform a process in response to receiving a request for a web page comprising a document written in markup language code from an external device via a network, the process comprising:
detecting embedded data contained in the markup language code of said document;
extracting said data from the markup language code of said document;
in response to detecting and extracting said data, deriving a characteristic value representing said extracted data;
comparing said derived characteristic value with previously stored characteristic values;
upon a match between said derived characteristic value and a previously stored characteristic value, modifying said document by replacing said extracted data in the markup language code of said document with a reference to a stored file associated with said stored characteristic value; and
transmitting said modified document to the external device via the network, without transmitting said data to the external device until a subsequent request for said data is made by the external device on the basis of said reference,
wherein said embedded data is a data URL.

16. Method according to claim 15,
wherein said step of deriving a characteristic value comprises applying a hash algorithm to said data.

17. Computer-implemented method implemented in a transcoding server, the method comprising:
receiving a request for a web page comprising a document written in markup language code from a client terminal;
retrieving said document from a web server,
detecting embedded data contained in the markup language code of said document;
extracting said data from the markup language code of said document;
in response to detecting and extracting said data, storing said extracted data as a separate file;
replacing said extracted data in the markup language code of said document with a reference to said file; and
forwarding the modified document to the client without forwarding said data to the client until a subsequent request for said data is made by the client on the basis of said reference,
wherein said embedded data is a data URL.

* * * * *